United States Patent

[11] 3,588,501

[72] Inventors Robert Dean Lowrey;
William A. Huffman, St. Paul, Minn.
[21] Appl. No. 826,691
[22] Filed May 21, 1969
[45] Patented June 28, 1971
[73] Assignee Minnesota Mining and Manufacturing Company
St. Paul, Minn.

[54] THERMOGRAPHIC PROCESS FOR THE MANUFACTURE OF PROJECTION TRANSPARENCIES AND MATERIALS THEREFORE
3 Claims, No Drawings

[52] U.S. Cl. .................................................... 250/65T, 101/470, 117/36.1
[51] Int. Cl. .................................................... G03b 41/00
[50] Field of Search.. .................................... 101/470; 117/36.1; 250/65 (1)

[56] References Cited

UNITED STATES PATENTS 3,239,366 3/1966 Miller et al. .................. 117/36.1
3,418,468 12/1968 Marx et al. .................... 250/65(1)

*Primary Examiner*—James W. Lawrence
*Assistant Examiner*—A. L. Birch
*Attorney*—Kinney, Alexander, Sell, Steldt & Delahunt

ABSTRACT: A source sheet coated with a particulate volatilizable solid in a polymeric binder yields a succession of projection transparencies on a single reusable transparent heat-resistant film receptor sheet in a thermographic image transfer process.

THERMOGRAPHIC PROCESS FOR THE MANUFACTURE OF PROJECTION TRANSPARENCIES AND MATERIALS THEREFORE

This invention relates to methods and sheet materials useful in the preparation of projection transparencies, and in one aspect has particular reference to transparencies economically produced for temporary use from originals printed on nontransparent substrates. As an example, the invention provides for the economical preparation of a series of projection transparencies of newspaper or magazine articles for one-time presentation in a class room.

The preparation of projection transparencies by a thermographic process involving vapor transfer of salicylic acid or other sublimable solids from a source sheet to a printed original and thence to a transparent receptor film is described in Marx et al. U.S. Pat. No. 3,418,468. The salicylic acid forms a permanent image. The source sheet is discarded.

The present invention makes possible the thermographic transfer of effective small proportions of image-forming material from a source sheet directly to a receptor film, with formation of strongly light-interfering images which can subsequently be easily and completely removed from the film, so that a succession of projection transparencies may be made with a single source sheet and receptor film maintained in registry.

In making a copy, the differentially radiation-absorptive original is briefly exposed to intense radiation while in heat-conductive contact with the composite of source sheet and receptor film. The resulting heat pattern produced at the image areas causes volatilization and transfer of a portion of the volatilizable material from the source sheet, with condensation thereof on the surface of the receptor film. A sufficient amount of material is thus transferred to provide a strongly light-distorting or light-absorptive image on the receptor so that an effective projection transparency is obtained.

As described in the Marx et al. patent, coatings of salicylic acid are removed at the heated areas, and the source sheet or transfer sheet is discarded after a single use. Furthermore the salicylic acid, upon being transferred to the transparent film, becomes an integral part of the film so that the light-diffusing image is permanent and cannot be removed.

It has now been found possible to make in succession at least five, and frequently as many as 12 to 15 fully defined projection transparencies with a single receptor sheet and transfer sheet, by employing a composite of particular receptor and transfer sheet materials as will be further described.

The transfer sheet comprises a thin backing coated with a composition containing a volatilizable material which, like the salicylic acid employed by Marx, melts at a temperature not less than about 150° C. and sublimes at a temperature well below its melting temperature, but which additionally shows a weight loss of only about 1 to about 8 percent, or preferably about 2 to about 7 percent, in 5 minutes at 135° C.

The test for weight loss or volatility is not particularly critical, and may be carried out simply by distributing a 1 gram sample of the material in powdered form over the bottom of an aluminum weighing dish having a diameter of 2 inches and a height of five-eighths inch, placing the dish on a suitably adjusted hot plate for the required time, and determining the resulting loss of weight as a percentage of the initial weight of the material. It is possible at the same time to make an estimation of the effectiveness of the condensate as a light-interfering deposit, simply by placing over the open dish a glass plate, such as a microscope slide, and permitting the vapors to condense thereon during the heating period. The appearance of the slide will then afford a rough estimate of the light-absorbing or light-diffusing ability of the deposit; or these properties may be more accurately determined by means of suitable optical instruments. Materials of maximum light-interfering properties are preferred.

The volatility of some characteristic materials as determined by the above test, together with their melting temperatures, is shown in the accompanying tabulation.

| | M.P., °C. | Wt. loss, percent |
|---|---|---|
| Salicylic acid | 159 | 9 |
| Hexamethylene tetramine | 160+(d) | 6.5 |
| Quinhydrone | 160+(d) | 6 |
| 2-hydroxy-1,4-naphthoquinone | 190 | 1.9 |
| "Oil Blue A" | 152 | .1 |
| 1-naphthol | 93 | 4.6 |

Of these several materials, salicylic acid shows excessive weight loss, and when employed in a source sheet is found to produce only a single fully defined copy. On the contrary, the blue dye is much too low in volatility and does not form a deposit of sufficient density to produce an effective projection image. The 1-naphthol, while of suitable volatility, is seen to melt well below the temperature of 150° C. normally reached during the thermographic process and as a result the transfer of this material cannot be properly controlled. The other three listed compounds, however, are nonmelting below about 150° C., show a weight loss within the required range of between 1 and 8 percent, and perform admirably in transfer sheets of the present invention. These volatilizable solids are also nontoxic and relatively free of odor. They do not decompose under normal operating or storage conditions, and are otherwise suitable for the purposes indicated.

Under storage at very high relative humidities, source sheets made with hexamethylenetetramine as the particulate volatilizable solid are subject to absorption of moisture, and such sheets are therefore not preferred under such conditions. Both quinhydrone and hydroxynaphthoquinone are substantially water-insoluble and may therefore be used under all humidity conditions. Of these, quinhydrone is dark in color and gives a more distinctly visible image under nonprojection viewing, and accordingly is preferred. Mixtures may also be used.

It has also been found essential, for the purposes of this invention, to include with the volatilizable solid a proportion of polymeric binder. The binder is effective in retaining the heavy coating of solid material on the surface of the supporting substrate or backing and additionally assists in controlling the volatilization of the material during the thermographic copying process. The amount by weight of volatilizable material should be from about one-half to about three parts for each one part by weight of binder. Polyvinyl acetate is a preferred binder material, but other polymeric binders, e.g. ethyl cellulose, polymethyl methacrylate, and cellulose acetate have also proven useful. Each of these materials in the form of a thin coating on a flexible backing is sufficiently heat-resistant to be nontacky toward bond paper when pressed thereagainst at 150° C. as in thermographic-copying machine, i.e. under a pressure of about 1 to 2 lbs./sq. in.

It is necessary that the volatilizable solid be retained in the binder film primarily in the form of uniformly distributed small discrete particles. Where the material is water-soluble, a useful procedure for preparing the coating mixture is to dissolve the solid in a minimum of water and then to mix the solution into a solution of the binder in a nonaqueous but water-miscible solvent in which the solid is thereby precipitated in particulate form. A more generally applicable procedure involves grinding the solid into a solution of the binder, again using a solvent in which the solid remains in particulate form. The solid material is essentially incompatible with, or insoluble in, the binder and remains as finely dispersed and uniformly distributed particles without causing any observable tackiness of the film at temperatures of up to 150° C.

An ethyleneglycol-terephthalate polyester film is a particularly desirable clear transparent heat-resistant receptor film, but other films which are sufficiently resistant to the temperatures reached in the thermographic-copying process and which are not solvated or otherwise affected by the condensation thereon of the volatilizable solid may also be used. The degree of heat-resistance required is such that no visible markings are produced on brief localized heating of the film to 150° C., as in the thermographic-copying process. While glass plates are useful under some restricted conditions, it is ordinarily preferable to employ flexible polymeric film, since most thermographic copying machines require flexibility in the film and sheet materials used. Transparent Lexan polycarbonate film may be used, being nonmarking at temperatures of 150° C. or somewhat higher.

The following specific Examples, in which all proportions are in parts by weight unless otherwise indicated, will further illustrate the practice of the invention.

EXAMPLE 1

A solution of two parts of hexamethylenetetramine in three parts of water is added to a solution of five parts of polyvinyl acetate in 15 parts of acetone. The hexamethylenetetramine precipitates in the form of small solid particles uniformly distributed throughout the mixture. The mixture is coated on map overlay tracing paper and dried, the dry-coating weight being 10 grams/sq.m. The sheet is placed with the coated surface against the surface of a 3 mil Mylar polyester film, and a graphic original is placed with its printed surface against the other surface of the source sheet. The composite is passed through a thermographic-copying machine where the printed surface is briefly exposed, through the transparent source sheet and receptor film, to intense radiant energy. The receptor film is removed and is found to carry a frosty image corresponding to the printed image of the original. The film is used a a projection transparency on an overhead projector and produces a black image and white background on the projection screen. The projected image decreases in density after prolonged projection. The image is completely removed from the film by wiping with a damp cloth, and the process is repeated using the same film and source sheet and producing a second equally effective projection transparency. Further transparencies are prepared, again from the same film and source sheet, up to a total of at least 10, each with fully defined images.

EXAMPLE 2

To a solution of four parts of cellulose acetate in 24 parts of acetone is added two parts of hexamethylenetetramine powder. The mixture is diluted with an equal weight of acetone and is homogenized by being passed twice through a laboratory homogenizer at 6000 and at 8000 lbs./sq.in. It is then coated on thin paper and dried, the uniform dry coating weighing 16 grams/sq.m.

The sheet is placed with its coated surface against the surface of 3 mil Mylar transparent polyester film. A graphic original is placed against the composite and irradiated as in example 1 to produce a first projection transparency. The image is subsequently removed from the film by wiping the damp cloth, and further images are similarly deposited and removed up to a total of at least 10.

EXAMPLE 3

To a solution of 20 parts of polyvinyl acetate in 180 parts of acetone is added 40 parts of powdered quinhydrone. The mixture is milled for 18 hours in a ball mill and is coated on 1½ mil Mylar film at a coating weight, after drying, of 10 grams/sq.m. The film is used as a transfer sheet in the process described in the previous examples, with production of at least 12 separate projection transparencies. The image areas on the film are dark in color and are easily visible, and form dense projected images.

EXAMPLE 4

60 parts of quinhydrone powder is blended into a solution of 20 parts of hydroxyethyl cellulose in 180 parts of water by high-speed mixing. The resulting dispersion is coated on half mil Mylar film at a dry-coating weight of 28.8 gm./sq.m. More than 10 projection transparency copies of a graphic original are produced in succession on 3 mil Mylar film, with intermediate removal of image, using the process previously described.

EXAMPLE 5

A dispersion of 20 parts of 2-hydroxy-1,4-naphthoquinone in a solution of 20 parts of polyvinyl acetate in 180 parts of acetone is prepared by prolonged milling in a ball mill. The mixture is coated on 1 mil Mylar film, the dry-coating weight being 21 gm./sq.m. Using the process previously described, a sequence of projection transparencies is prepared on a single sheet of 3 mil Mylar film from a graphic original, to a total of more than 10 copies.

What is claimed is as follows:

We claim:

1. A source sheet adapted for making at least five successive projection transparencies from a single sheet of clear transparent heat-resistant receptor film which is nonmarking at 150° C., by a process involving repetitive thermographic image transfer, said sheet consisting essentially of a thin infrared-transmitting backing coated with a polymeric binder, nontacky at about 150° C., containing uniformly distributed particles of volatilizable solid; said coating being present in an amount of about 10 to about 30 gm./sq.m.; the ratio by weight of said solid to said binder being from about 0.5 to about 3.0; said solid being further characterized as being nonmelting below about 150° C., having a volatility expressed as a weight loss of about 1 to about 8 percent in 5 minutes at 135° C., and being sufficiently incompatible with said binder to permit the coating to remain nontacky at 150° C.

2. The source sheet of claim 1 wherein said solid comprises hexamethylenetetramine, quinhydrone or hydroxynaphthoquinone and is present in a said ratio of about 1 to about 2.

3. The method of making a series of projection transparencies from a single sheet of clear transparent heat-resistant receptor film comprising transferring a first image to a said sheet from a source sheet as defined in claim 1 by a thermographic process involving brief exposure of a differentially radiation-absorptive original to intense radiation while in heat-conductive contact with the composite of said source sheet and said film, to form on said film a dense light-disturbing image without visibly altering said film, and subsequently removing said image; and then repeating the process to make additional projection transparencies.